W. L. WEBSTER.
MEANS USED IN ACCOUNTING.
APPLICATION FILED SEPT. 9, 1916.

1,254,870.

Patented Jan. 29, 1918.

FIG.1.

FIG.2.

Inventor
Walter L. Webster
By his Attorneys
Emery, Booth, Janney & Varney

UNITED STATES PATENT OFFICE.

WALTER L. WEBSTER, OF BROOKLYN, NEW YORK.

MEANS USED IN ACCOUNTING.

1,254,870.  Specification of Letters Patent.  Patented Jan. 29, 1918.

Application filed September 9, 1916. Serial No. 119,278.

*To all whom it may concern:*

Be it known that I, WALTER L. WEBSTER, a citizen of the United States, and a resident of Brooklyn, in the county of Kings and State of New York, have invented an Improvement in Means Used in Accounting, of which the following is a specification.

This invention relates to accounting, and with regard to certain more specific features, to a receipt voucher.

One of the objects of the invention is to provide an article whereby time, labor and expense may be saved in making out various records.

Another object is to provide an inexpensive and complete record for a broker during the time that he is awaiting payment from a payer, and at the same time to furnish a receipt for both broker and payer after the payment has reached the payee.

Another object is to provide an article enabling the user at a single writing to advise a payer of a payment due, to furnish the broker with a receipt from the payee, and to furnish the payer with a receipt from the payee, the latter receipt omitting certain information appearing on the broker's receipt, all at a single writing.

Another object is to provide an inexpensive and easily handled device readily understood by a comparatively unskilled operator and available for producing quickly information ordinarily obtained only at materially greater cost.

Other features will be in part obvious and in part pointed out hereinafter.

The invention accordingly comprises the features of construction and operation, combinations of elements and arrangements of parts which are exemplified in the structure hereinafter described and the scope of the application of which will be indicated in the following claims.

In the accompanying drawings, in which is shown one of various possible embodiments of this invention, Figure 1 is a face view of a preferred form of sheet.

Fig. 2 is a view of the reverse side of Fig. 1.

Similar reference characters refer to similar parts throughout both views of the drawings.

In considering this invention in its relation to the prior art, it may be noted that for many years attempts have been made to provide at minimum cost for material, time and labor, a record of payments through an agent, that will afford the payer assurance that his payment has actually reached the payee, the advisability of such a record appearing particularly in instances where the broker or other agent acts as the agent of the payer, as in the handling of insurance premiums where the assured may be considered as the payer of the premium, the broker as the agent, and the insurance company the payee. The present invention is illustrated and described in connection with insurance records, although it will be obvious that many if not all of the features thereof are equally applicable to a variety of financial transactions.

Referring now to the accompanying drawings, there is illustrated a sheet comprising three separable coupons 1, 2, 3, which for convenience may be referred to respectively as the original, duplicate and triplicate. The scoring or perforations 5 facilitate the separation of the coupons. The three coupons contain spaces for data of interest to the payer or assured, such as the name of the assured, name of the insurance company, name of the broker, date of mailing of the policy, policy number, property insured, date of policy, and amount of premium. The second or duplicate coupon 2 has a portion extending toward the right beyond the right-hand edge of coupons 1 and 3, and on this extension are spaces for entry of data not to be transmitted to the payer, such as the amount of the broker's commission to be deducted from the premium, and the net remittance from broker to payee, that is, the difference between the premium and the commission.

In using this sheet, the three coupons are folded together at the perforations 5, preferably with the original on top, the triplicate at the bottom, and the duplicate between. A transfer device, such as carbon paper, is then inserted between the original and duplicate and between the duplicate and triplicate, and then at a single writing, the various blanks in all of the coupons are filled in, including the items for commission and net, appearing on the duplicate only. If the transfer device is secured to or is part of the coupons, then the sheet is ready for writing as soon as it is folded.

After removing the carbon papers, one of the coupons, preferably the triplicate, is detached and sent to the payer as a statement of his account or memorandum or bill indicating the amount of payment due and the date the premium is due. The original and duplicate are retained by the broker as a memorandum that the bill has been sent to the payer.

When the remittance is received by the broker from the payer, either with or without the triplicate invoice, the broker sends to the payee the original and duplicate, together with his remittance for the net amount, that is, the premium minus the commission, this net amount being indicated clearly on the duplicate coupon. The payee then acknowledges receipt upon the original and duplicate, by stamp or otherwise, and returns both original and duplicate to the broker, who separates these two coupons at the perforations 5, sends the original to the payer and retains the duplicate.

In this way, the payer is given a receipt directly from the payee, and is thus assured that his payment has actually reached the payee. Furthermore, the broker has a permanent receipt from the payee for his payment of the net amount, with an indication on the receipt of the amount of the premium and the commission. And all this together with the preliminary statement or bill to the assured, is afforded by a single writing of data simultaneously upon the three coupons of the sheet.

For convenience in handling, the sheets may be folded by the printer into the form for typewriting or writing, and may then be bound in pads, preferably at the outer or right-hand edge of the extension 7 of the duplicate coupon, since at this point there is but a single thickness of material for each sheet.

It will be understood that the words "original," "duplicate" and "triplicate" are simply used for convenience to designate the three portions of the device, and said words are obviously interchangeable, and the relative location of the three coupons is likewise to be understood as interchangeable without departing from the spirit or scope of this invention.

From the above, it will be seen that the several objects of the invention are realized, and other advantageous results obtained.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus revealed my invention, I claim and desire to secure by Letters Patent of the United States:—

1. A triplicate invoice and receipt comprising a sheet divided into three separable coupons by weakening lines, two of said coupons being inscribed on their obverse faces with suitable data and the third coupon being inscribed on its reverse face with inverted similar data, one coupon having one side extending beyond the side edges of the other coupons, whereby when the coupons are folded together at their adjacent edges with manifolding material between they may all be written upon simultaneously and one of the coupons receive matter which is not to appear on the other coupons, two of said coupons constituting receipt forms to be receipted by the payee, one of which is ultimately sent to the broker and the other to the payer.

2. A triplicate invoice and receipt comprising a sheet divided transversely into three separable coupons by weakening lines, the upper and lower coupons being inscribed on their obverse faces with suitable data and the third coupon being inscribed on its reverse face with inverted similar data and having one side edge extending beyond the side edges of the first mentioned coupons whereby when the coupons are folded together at their adjoining edges along said weakening lines with intervening manifolding material they may all be written upon simultaneously and the third coupon receive matter not appearing on the other coupon, two of said coupons constituting receipt forms to be receipted by the payee, one of which is ultimately sent to the broker and the other to the payer.

In testimony whereof, I have signed my name to this specification this ninth day of September, 1916.

WALTER L. WEBSTER.